(No Model.)

E. L. NASH.
CHICKEN COOP.

No. 290,346. Patented Dec. 18, 1883.

WITNESSES:
Thos Houghton.
W. X. Stevens.

INVENTOR:
E. L. Nash
BY Munn & Co
ATTORNEYS.

UNITED STATES PATENT OFFICE.

EDMUND L. NASH, OF PARKERSBURG, WEST VIRGINIA.

CHICKEN-COOP.

SPECIFICATION forming part of Letters Patent No. 290,346, dated December 18, 1883.

Application filed August 27, 1883. (No model.)

*To all whom it may concern:*

Be it known that I, EDMUND L. NASH, a citizen of the United States, residing at Parkersburg, in the county of Wood and State of West Virginia, have invented a new Improvement in Chicken-Coops, of which the following is a specification.

My invention relates to that class of chicken-coops used to transport poultry and to expose it for sale; and it has for its object to produce a strong, durable, light, and inexpensive coop.

To this end my invention consists in the combination of a wooden frame bound together by corner-bolts, a board bottom, and wire slats, as hereinafter described and claimed, reference being had to the accompanying drawings, in which—

Figure 1:
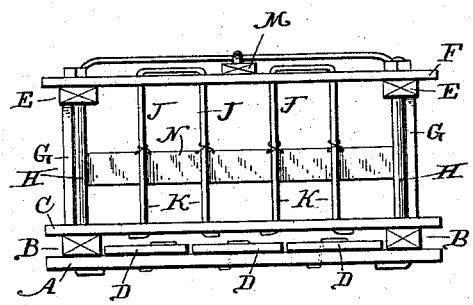
Figure 2:
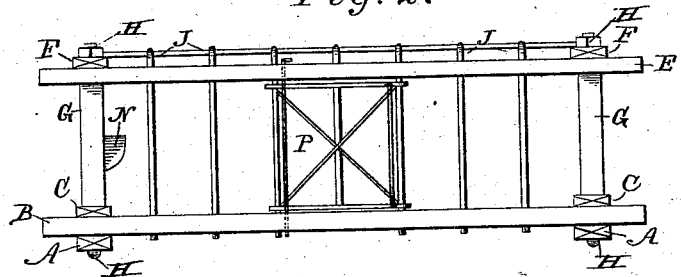
Figure 3:
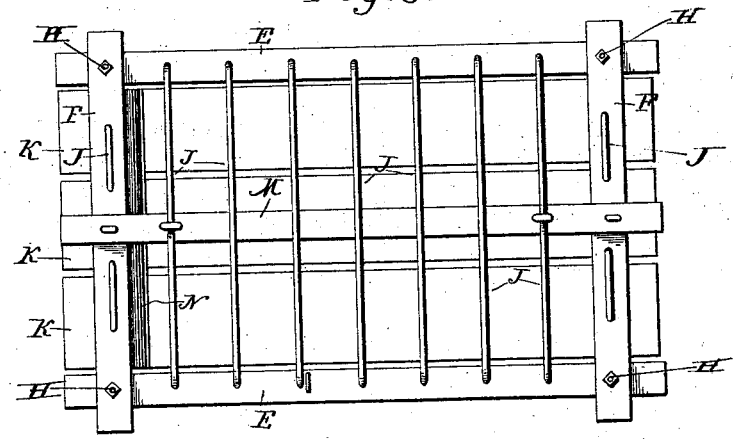

Figure 1 is an end elevation, Fig. 2 is a side elevation, and Fig. 3 is a top view, of my chicken-coop.

A represents the lower strips of the frame, of which there is one at each end of the coop. Upon these end strips are laid two side bottom strips, B. On top of these side strips another pair of cross-strips, C, are laid, leaving space for inserting the bottom boards, D, between them and the lower strips, A, so that the bottom is independent of the sides or crate of the coop. Thus the bottom may be removed when the coop rests on the ground without the chickens escaping; or the chickens may be permitted to stand on the ground and scratch or feed in the coop, and then the bottom may be pushed in, forcing the chickens to hop onto it and be thus completely cooped.

E and F represent top strips, supported on corner-posts G, which rest on the upper bottom strips.

H represents four bolts—one at each corner—passing up through all the frame-strips A, B, C, E, and F, and by means of screws and nuts at their top ends, firmly binding the bottom strips up and the top strips down upon the posts G, forming a rigid frame.

J represents the slats, consisting of wires in the form of staples. At the ends of the coop both legs of each staple pass down through first the top strip, F, and then the upper bottom strip, C, in which they are made fast and do not cross the space between strips C and A, leaving that open to admit the bottom boards. The latter are fastened in any suitable manner, as by wire pins passing through the bottom boards and frame and bent. The wires J are each laid across the top of the coop and bent downward, passing through both side strips, B and E, at each side of the coop, thus making it very strong and simple. There may be one or more longitudinal top strips, M, secured to the frame to further stiffen it.

N is a feed and water trough, to be hooked removably inside the coop.

P is a door, made in any usual way for inserting the arm to catch any single chicken wanted and to remove it from the coop.

The advantages of my coop are strength, lightness, convenience, and cheapness.

What I claim as my invention, and wish to secure by Letters Patent, is—

1. The combination, with an upper and a lower rectangular frame of a chicken-coop, of four posts between the upper and lower frames at the corners, and four screw-bolts passing through the two frames and binding them rigidly upon the posts, as described.

2. The combination, with the upper and lower rectangular frames of a chicken-coop, of wires, each of which passes across the top of the coop and down through the side strips of the coop, as shown and described.

3. The combination, with the upper and lower rectangular frames of a chicken-coop, of cross-pieces secured above the lower cross-frame and wires in the form of staples passing down through the upper cross-piece and secured in the cross-pieces above the lower cross-pieces, thereby forming complete ends to the coop while leaving a space for insertion and removal of the bottom, as specified.

EDMUND L. NASH.

Witnesses:
C. D. MERRICK,
J. W. DUDLEY.